(12) United States Patent
Gramme et al.

(10) Patent No.: US 7,617,940 B2
(45) Date of Patent: Nov. 17, 2009

(54) ARRANGEMENT RELATED TO A SEPARATOR FOR THE CLEANING OF SUCH SEPARATOR

(75) Inventors: Per Eivind Gramme, Porsgrunn (NO); Gunnar Hannibal Lie, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 33 days.

(21) Appl. No.: 11/884,047

(22) PCT Filed: Feb. 15, 2006

(86) PCT No.: PCT/NO2006/000064

§ 371 (c)(1),
(2), (4) Date: Oct. 16, 2007

(87) PCT Pub. No.: WO2006/088376

PCT Pub. Date: Aug. 24, 2006

(65) Prior Publication Data

US 2008/0156716 A1 Jul. 3, 2008

(30) Foreign Application Priority Data

Feb. 18, 2005 (NO) .................................. 20050901

(51) Int. Cl.
*B01D 17/02* (2006.01)
(52) U.S. Cl. .................... 210/519; 210/532.1; 210/540; 134/22.11
(58) Field of Classification Search ................ 210/519, 210/532.1, 533, 540; 15/3.5, 3.51; 134/22.11, 134/166 C
See application file for complete search history.

(56) References Cited

U.S. PATENT DOCUMENTS 2,355,305 A * 8/1944 Koenig .................... 210/519
3,814,262 A * 6/1974 Nolley, Jr. ................ 210/519

(Continued)

FOREIGN PATENT DOCUMENTS

WO 02/076642 10/2002

(Continued)

OTHER PUBLICATIONS

Patent Cooperation Treaty (PCT) Written Opinion of the International Preliminary Examining Authority, date of mailing Mar. 7, 2007.

(Continued)

*Primary Examiner*—Christopher Upton
(74) *Attorney, Agent, or Firm*—Wenderoth, Lind & Ponack, L.L.P.

(57) ABSTRACT

A device in connection with a separator for cleaning or reaming such a separator. The separator includes a tank or a body (2) with an inlet and at least one outlet (5, 6). A transport pipeline (3) is connected to the inlet for the supply of fluid that is to be separated in the separator. The transport pipeline (3) extends from the inlet through the separator body (2). Part (6) of the line that is located inside the separator body (2) is provided with perforations or slits (7) so that fluid that arrives in the transport pipeline (3) flows into the tank through the perforations/slits (7). Mechanical equipment for cleaning the transport pipeline (3) is designed to be sent from a magazine through the separator body (2) and on via a pipe loop back to the magazine.

6 Claims, 2 Drawing Sheets

U.S. PATENT DOCUMENTS

| | | | | |
|---|---|---|---|---|
| 5,837,152 | A * | 11/1998 | Komistek et al. | 210/519 |
| 5,890,531 | A * | 4/1999 | Gairns et al. | 15/3.51 |
| 6,277,286 | B1 * | 8/2001 | Sontvedt et al. | 210/521 |
| 6,533,929 | B2 * | 3/2003 | Binsfeld et al. | 210/540 |
| 6,679,949 | B2 | 1/2004 | De Almeida | |
| 7,278,543 | B2 * | 10/2007 | Sagatun et al. | 210/540 |
| 2001/0047811 | A1 * | 12/2001 | Sivacoe | 134/22.11 |
| 2002/0117186 | A1 | 8/2002 | De Almeida | |
| 2004/0099406 | A1 * | 5/2004 | Schildmann et al. | 15/3.5 |
| 2005/0006086 | A1 | 1/2005 | Gramme | |
| 2006/0124313 | A1 * | 6/2006 | Gramme et al. | 166/357 |
| 2008/0178915 | A1 * | 7/2008 | Gramme et al. | 134/169 C |

FOREIGN PATENT DOCUMENTS

| | | | |
|---|---|---|---|
| WO | 03/033872 | | 4/2003 |
| WO | 2004/016907 | | 2/2004 |
| WO | WO 2006/118468 | * | 9/2006 |

OTHER PUBLICATIONS

Patent Cooperation Treaty (PCT) International Preliminary Report on Patentability, International Application No. PCT/NO2006/000064, date of completion Jun. 28, 2007.

* cited by examiner

ARRANGEMENT RELATED TO A SEPARATOR FOR THE CLEANING OF SUCH SEPARATOR

BACKGROUND OF THE INVENTION

1. Technical Field

The present invention concerns a device in connection with a separator for cleaning (pigging) or reaming such a separator. The separator comprises a tank or a container with an inlet and at least one outlet. A transport pipe is connected to the inlet for the supply of fluid that is to be separated in the separator.

2. Description of the Related Art

In processes in which fluids, for example oil, gas and water, are transported in connection with the extraction of oil and gas from subterranean reservoirs, an internal scale may be built up or sand or sludge may be deposited in the pipe systems and equipment used in the extraction process. Mechanical equipment such as reamers or remote-controlled tractors or robot devices is often used to remove this.

The applicant's own international patent application PCTNO/03/00301 shows and describes a combined separator solution in which the inlet of a conventional gravitation separator is designed as a pipe separator in connection with which the fluid to be separated undergoes stratification so that the fluid has already started to separate when it flows into the conventional separator. However, neither this prior art solution nor conventional gravitation separators are designed for cleaning with mechanical devices. It is therefore often very expensive and often impossible to clean the pipe systems in connection with conventional separators.

SUMMARY OF THE INVENTION

The present invention represents a solution for such separators that makes it possible to use mechanical devices for the cleaning operation.

The present invention is characterized in that the transport pipeline extends from the inlet through the separator body. Part of the line that is located inside the separator body is provided with perforations or slits so that fluid that arrives in the transport pipeline flows into the tank through the perforations/slits.

BRIEF DESCRIPTION OF THE DRAWINGS

The present invention will be described in further detail in the following using examples and with reference to the attached drawings, where.

DETAILED DESCRIPTION OF THE INVENTION

Figure 1:
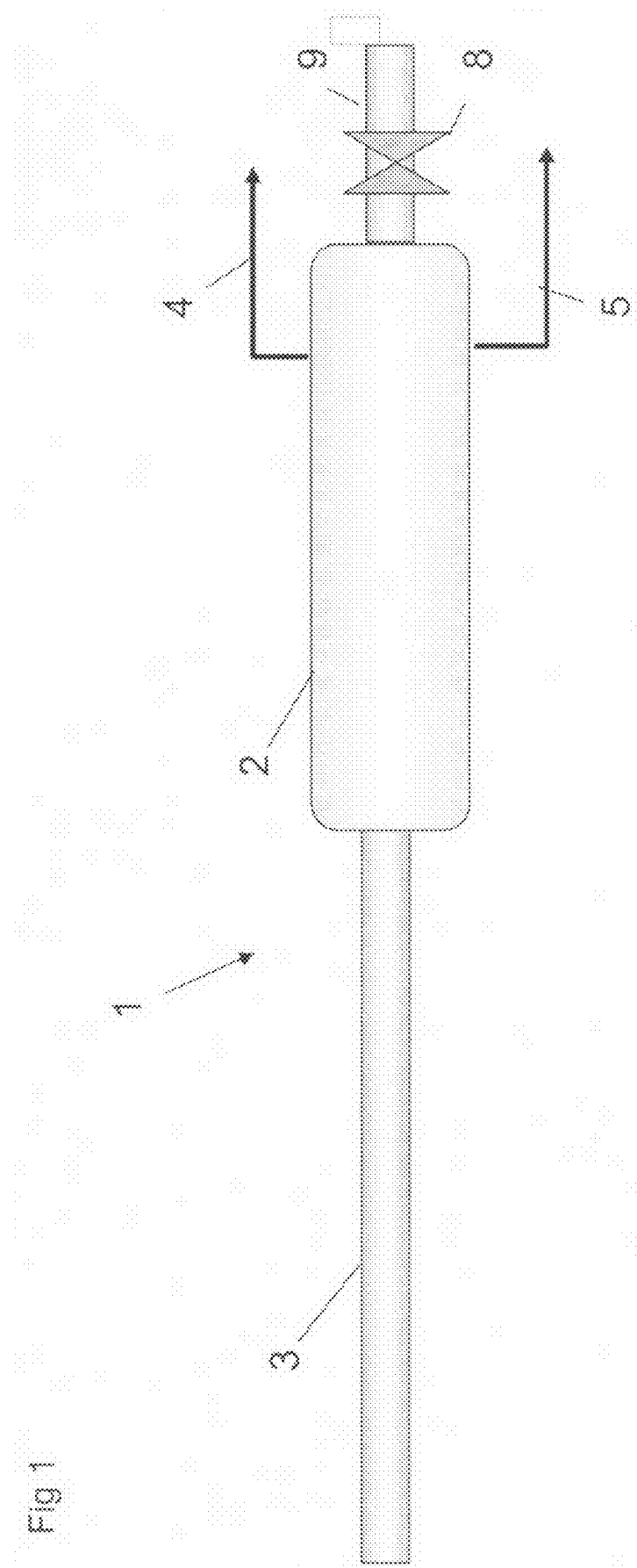
FIG. 1 is a side view, seen from the outside, of a gravitation separator with a solution in accordance with the present invention.
Figure 2:
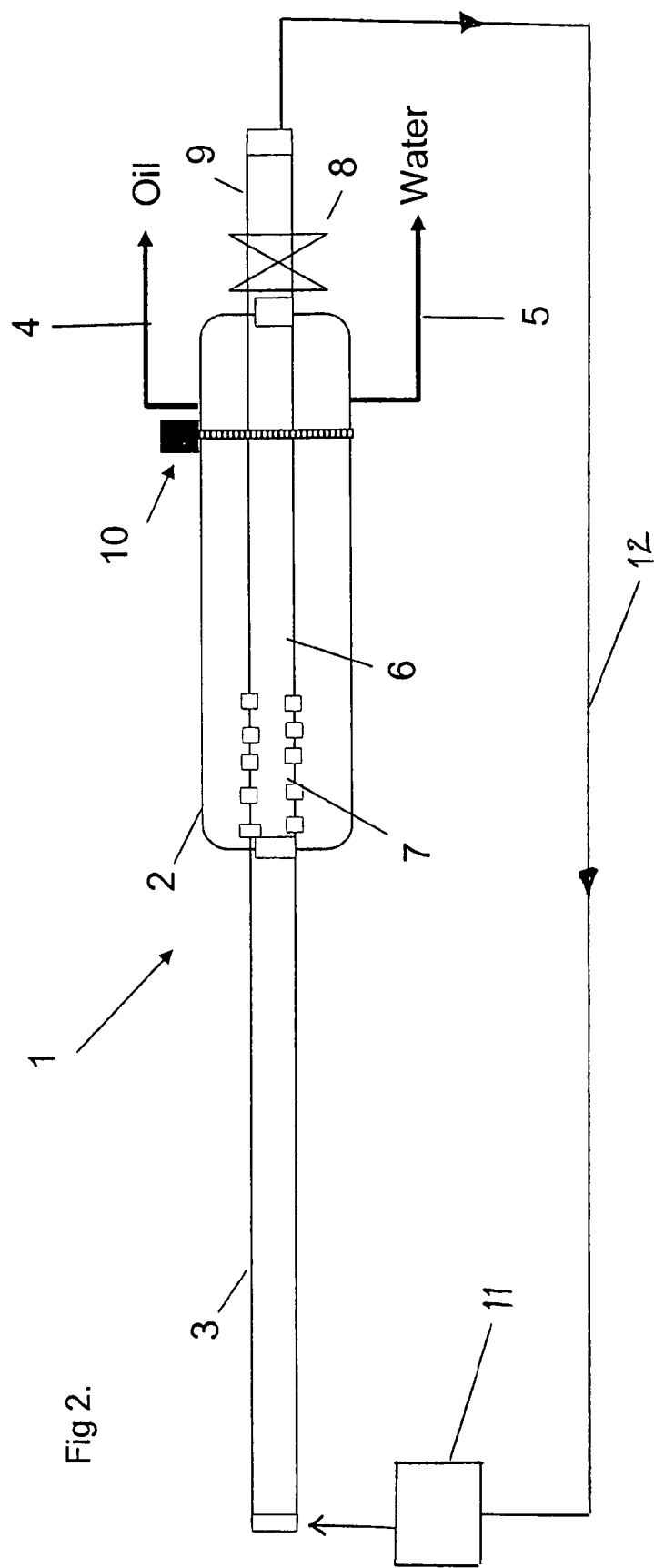
FIG. 2 is a cross-sectional view of the gravitation separator shown in FIG. 1.

FIGS. 1 and 2 show, as stated above, a gravitation separator 1, for example for separation of oil and water, consisting in the case shown here of a cylindrical tank or body 2 with an inlet connected to a transport pipeline (inlet pipeline) 3 and separate outlets (illustrated only with arrows) for oil 4 and water 5, respectively. A level meter 10, which registers the fluid profile and fluid level to control the inflow and outflow of fluid, is arranged in the separator.

The special feature of the present invention is that the transport pipeline 3 extends from the inlet through the separator body 2. The part 6 of the line that is located inside the separator body 2 is provided with perforations or slits 7 so that fluid that arrives in the transport pipeline 3 flows into the tank through the perforations/slits 7. A valve 8 is arranged in the pipe 9 downstream of the separator body 2. This valve 8 is closed when the separator is in operation. With this solution, it is possible to clean the transport pipeline 3 using a mechanical device (pig) or reamer. This device can be sent from a magazine 11 through the pipe 6 in the separator body and on via a pipe loop 12 and back to the magazine.

The valve 8, which can expediently be remote-controlled, will be open during cleaning. The mechanical cleaning may be designed for automatic operation or be controlled manually, as required.

Without such a continuous pipe in the separator, it is not possible to perform mechanical cleaning of the pipe systems connected to conventional separators as it will not be possible to return or evacuate the mechanical device used for cleaning.

The invention claimed is:

1. An apparatus for separating fluids, the apparatus comprising:
   a separator tank or body having an inlet and at least one outlet; and
   a transport pipeline connected to the inlet for the supply of the fluids that are to be separated in the separator tank or body,
   wherein the transport pipeline extends from the inlet of the separator tank or body completely through the separator tank or body, and the part of the pipeline that is located inside the separator tank or body is provided with perforations or slits arranged so that fluid that arrives in the transport pipeline can flow into the separator tank or body through the perforations or slits.

2. An apparatus as claimed in claim 1, wherein the transport pipeline is provided with a valve disposed downstream of the separator tank or body.

3. An apparatus as claimed in claim 2, further comprising a magazine for sending mechanical equipment for cleaning the transport pipeline from the magazine through the separator tank or body and on via a pipe loop back to the magazine.

4. An apparatus as claimed in claim 1, further comprising a magazine for sending mechanical equipment for cleaning the transport pipeline from the magazine through the separator tank or body and on via a pipe loop back to the magazine.

5. A method of cleaning the apparatus as claimed in claim 1, comprising sending mechanical equipment through the transport pipeline to clean the transport pipeline.

6. A method as claimed in claim 5, further comprising sending the mechanical equipment from a magazine through the transport pipeline in the separator tank or body and on via a pipe loop back to the magazine.

* * * * *